(12) United States Patent
Vallejo et al.

(10) Patent No.: US 11,471,798 B2
(45) Date of Patent: Oct. 18, 2022

(54) LIQUID FILTRATION SYSTEM

(71) Applicant: REGFILTER, S.L., Cantabria (ES)

(72) Inventors: Jorge Gómez Vallejo, Cantabria (ES); Luis Miguel Muñiz González, Cantabria (ES)

(73) Assignee: REGFILTER, S.L., Cantabria (ES)

( * ) Notice: Subject to any disclaimer, the term of this patent is extended or adjusted under 35 U.S.C. 154(b) by 56 days.

(21) Appl. No.: 17/094,016

(22) Filed: Nov. 10, 2020

(65) Prior Publication Data

US 2022/0143534 A1 May 12, 2022

(51) Int. Cl.

| | |
|---|---|
| *B01D 29/15* | (2006.01) |
| *B01D 29/05* | (2006.01) |
| *B01D 29/64* | (2006.01) |
| *B01D 29/66* | (2006.01) |
| *C02F 1/00* | (2006.01) |
| *B01D 29/52* | (2006.01) |
| *B01D 37/02* | (2006.01) |
| *B01D 29/90* | (2006.01) |
| *C02F 103/00* | (2006.01) |
| *C02F 103/42* | (2006.01) |

(52) U.S. Cl.
CPC ............ *B01D 29/15* (2013.01); *B01D 29/05* (2013.01); *B01D 29/52* (2013.01); *B01D 29/6438* (2013.01); *B01D 29/668* (2013.01); *B01D 29/902* (2013.01); *B01D 37/02* (2013.01); *C02F 1/004* (2013.01); *C02F 1/006* (2013.01); *B01D 2201/0446* (2013.01); *B01D 2201/087* (2013.01); *B01D 2201/16* (2013.01); *C02F 2103/007* (2013.01); *C02F 2103/42* (2013.01); *C02F 2201/005* (2013.01); *C02F 2301/046* (2013.01); *C02F 2303/16* (2013.01)

(58) Field of Classification Search
None
See application file for complete search history.

(56) References Cited

U.S. PATENT DOCUMENTS

| | | | | | |
|---|---|---|---|---|---|
| 385,333 | A | * | 6/1888 | Way ....................... | B01D 29/15 210/454 |
| 2,301,430 | A | * | 11/1942 | Malanowski .......... | B01D 29/52 210/497.1 |

(Continued)

FOREIGN PATENT DOCUMENTS

WO    WO-2018211161 A1 *  11/2018  ............. B01D 29/15

*Primary Examiner* — Robert J Popovics
(74) *Attorney, Agent, or Firm* — Soroker Agmon Nordman; Sharone Godesh; Daniel Schatz

(57) ABSTRACT

A liquid filtration system comprising a filtration tank with: a separating roof on which are mounted groups of hoses fixed to respective support plates; a fluid distributor plate comprising a central portion without perforations, and a peripheral portion with a plurality of perforations, said distributor plate being located between the hoses and a lower inlet duct for the water to be filtered comprising an upper opening for supplying liquid to the holes near the central portion of the distributor plate and a lower opening for supplying liquid to the holes of the peripheral portion which are furthest from the central portion. The filter comprises a filter material, an outlet duct for the filtered water at the upper area of the tank, a regeneration circuit of the filter medium; a filter self-cleaning circuit and a control panel.

7 Claims, 2 Drawing Sheets

(56) References Cited

U.S. PATENT DOCUMENTS

| | | | | |
|---|---|---|---|---|
| 2,475,561 A * | 7/1949 | Cooperider et al. | B01D 33/21 | 210/324 |
| 2,651,414 A * | 9/1953 | Lawson | B01D 17/10 | 210/DIG. 5 |
| 2,819,800 A * | 1/1958 | Goodloe | B01D 25/00 | 210/488 |
| 2,872,044 A * | 2/1959 | Kasten | B01D 25/00 | 210/488 |
| 3,055,290 A * | 9/1962 | Arvanitakis | B01D 33/0183 | 210/407 |
| 3,100,190 A * | 8/1963 | Hobson, Jr. | B01D 29/52 | 210/497.1 |
| 3,310,175 A * | 3/1967 | McLagan | B01D 37/02 | 55/296 |
| 3,319,793 A * | 5/1967 | Miller, Jr. | B01D 29/902 | 210/243 |
| 3,394,815 A * | 7/1968 | Harms | B01D 29/52 | 210/457 |
| 3,447,690 A * | 6/1969 | Kracklauer | B01D 29/6484 | 55/299 |
| 3,556,304 A * | 1/1971 | Collard | B01D 29/52 | 210/489 |
| 3,642,141 A * | 2/1972 | Hobson, Jr. | B01D 29/15 | 210/457 |
| 4,089,781 A * | 5/1978 | Asp | B01D 29/114 | 210/411 |
| 4,094,784 A * | 6/1978 | Hirano | B01D 33/52 | 210/780 |
| 4,157,900 A * | 6/1979 | Margraf | B01D 46/0005 | 55/379 |
| 4,246,114 A * | 1/1981 | Krebs | C02F 3/1242 | 210/220 |
| 4,292,180 A * | 9/1981 | Zylka | B01D 29/111 | 210/497.01 |
| 4,340,477 A * | 7/1982 | Hobson, Jr. | B01D 29/66 | 210/241 |
| 4,439,327 A * | 3/1984 | Muller | B01D 29/92 | 210/791 |
| 4,526,688 A * | 7/1985 | Schmidt, Jr. | B01D 29/15 | 210/489 |
| 4,578,197 A * | 3/1986 | Muller | B01D 29/52 | 210/333.1 |
| 4,592,847 A * | 6/1986 | Schumacher | B01D 29/94 | 210/186 |
| 4,609,462 A * | 9/1986 | Flynn | B01D 29/52 | 210/232 |
| 4,622,137 A * | 11/1986 | Kessler | B01D 29/15 | 210/167.13 |
| 4,657,673 A * | 4/1987 | Kessler | B01D 24/14 | 210/167.13 |
| 4,836,936 A * | 6/1989 | Schewitz | B01D 29/60 | 210/791 |
| 4,872,981 A * | 10/1989 | Hobson, Jr. | B01D 29/90 | 210/420 |
| 4,919,801 A * | 4/1990 | Hobson, Jr. | B01D 29/114 | 210/388 |
| 4,944,887 A * | 7/1990 | Frederick | B01D 29/70 | 210/791 |
| 5,017,241 A * | 5/1991 | Ryan | B01D 29/52 | 210/791 |
| 5,084,176 A * | 1/1992 | Davis | B01D 33/37 | 209/381 |
| 5,114,596 A * | 5/1992 | Laterra | B01D 29/114 | 134/22.12 |
| 5,203,998 A * | 4/1993 | Benian | B01D 29/76 | 210/493.1 |
| 5,227,076 A * | 7/1993 | Bogen | B01D 35/303 | 210/791 |
| 5,230,131 A * | 7/1993 | Hobson, Jr. | B01D 29/96 | 29/402.06 |
| 5,401,406 A * | 3/1995 | Johnson | B01D 29/66 | 210/450 |
| 5,407,570 A * | 4/1995 | Hobson, Jr. | B01D 29/15 | 210/232 |
| 5,437,788 A * | 8/1995 | Geibel | B01D 29/661 | 210/411 |
| 5,441,633 A * | 8/1995 | Schewitz | B01D 29/908 | 210/323.2 |
| 5,494,591 A * | 2/1996 | Stamm | B01D 29/114 | 210/791 |
| 5,591,329 A * | 1/1997 | Davidson | B01D 29/21 | 210/493.1 |
| 5,609,835 A * | 3/1997 | Pitcher | B01J 8/006 | 366/14 |
| 5,871,641 A * | 2/1999 | Davidson | B01D 29/21 | 210/167.13 |
| 6,036,862 A * | 3/2000 | Stover | C02F 3/006 | 210/603 |
| 6,051,138 A * | 4/2000 | Hobson, Jr. | B01D 29/72 | 55/379 |
| 6,217,781 B1* | 4/2001 | Hobson, Jr. | B01D 29/52 | 210/791 |
| 6,309,552 B1* | 10/2001 | Hobson, Jr. | B01D 29/52 | 210/791 |
| 6,332,977 B1* | 12/2001 | Janecek | B01D 37/02 | 210/96.1 |
| 6,365,054 B1* | 4/2002 | Kruger | B01D 35/16 | 210/411 |
| 6,437,211 B2* | 8/2002 | Kaye | A61L 11/00 | 210/764 |
| 6,439,273 B1* | 8/2002 | Kruger | B01D 29/114 | 141/69 |
| 6,472,580 B2* | 10/2002 | Kaye | A61L 2/18 | 588/317 |
| 6,660,164 B1* | 12/2003 | Stover | C02F 3/006 | 210/194 |
| 6,814,878 B2* | 11/2004 | Tully | B01J 8/0005 | 422/232 |
| 6,886,698 B2* | 5/2005 | Tully | B01J 8/0005 | 210/477 |
| 6,890,129 B2* | 5/2005 | Fabbri | F26B 25/002 | 406/146 |
| 6,959,504 B2* | 11/2005 | Fabbri | B08B 9/0933 | 34/179 |
| 8,066,953 B2* | 11/2011 | Muth | B01J 19/0066 | 422/208 |
| 8,470,182 B2* | 6/2013 | Muth | B01J 19/0066 | 588/317 |
| 8,992,775 B2* | 3/2015 | Swindell | B01D 29/21 | 210/411 |
| 9,108,872 B2* | 8/2015 | Salmisuo | B09B 3/45 | |
| 10,406,458 B1* | 9/2019 | Nehlen, III | B01D 29/15 | |
| 10,427,076 B2* | 10/2019 | Swindell | B01D 29/21 | |
| 10,814,255 B1* | 10/2020 | Nehlen, III | B01D 37/02 | |
| 10,814,256 B1* | 10/2020 | Nehlen, III | B01D 29/17 | |
| 10,850,216 B1* | 12/2020 | Nehlen, III | B01D 29/90 | |
| 10,981,091 B1* | 4/2021 | Nehlen, III | B01D 29/90 | |
| 11,065,566 B2* | 7/2021 | Nehlen, III | B01D 29/906 | |
| 11,072,541 B2* | 7/2021 | Nazzer | C02F 1/004 | |
| 11,148,071 B2* | 10/2021 | Kelsey | C10G 33/06 | |
| 11,167,226 B2* | 11/2021 | Nehlen, III | B01D 36/001 | |
| 11,331,616 B2* | 5/2022 | Henderson | B01D 24/14 | |
| 2001/0009969 A1* | 7/2001 | Kaye | A61L 2/18 | 588/249.5 |
| 2001/0053869 A1* | 12/2001 | Kaye | B09B 3/0075 | 588/303 |
| 2002/0006769 A1* | 1/2002 | Tsuihiji | B01D 69/14 | 451/87 |
| 2003/0000101 A1* | 1/2003 | Fabbri | F26B 11/14 | 34/467 |
| 2003/0000103 A1* | 1/2003 | Fabbri | F26B 25/007 | 34/576 |
| 2003/0196951 A1* | 10/2003 | Tully | B01J 8/006 | 210/511 |
| 2004/0026312 A1* | 2/2004 | Tully | B01J 8/08 | 210/488 |
| 2005/0218058 A1* | 10/2005 | Tully | B01J 8/006 | 210/241 |

(56) References Cited

U.S. PATENT DOCUMENTS

| | | | |
|---|---|---|---|
| 2006/0231510 A1* | 10/2006 | Benachenhou | B01D 17/0208 210/DIG. 5 |
| 2008/0099408 A1* | 5/2008 | Swindell | B01D 29/96 210/797 |
| 2008/0237152 A1* | 10/2008 | Benachenhou | B01D 17/10 210/442 |
| 2015/0174515 A1* | 6/2015 | Swindell | B01D 29/52 210/791 |
| 2015/0196182 A1* | 7/2015 | Hekman | A47L 11/305 210/97 |
| 2016/0271531 A1* | 9/2016 | Nazzer | B01D 29/865 |
| 2017/0043278 A1* | 2/2017 | Kelsey | B01D 17/10 |
| 2018/0161706 A1* | 6/2018 | Masetto | B01D 29/6476 |
| 2018/0222769 A1* | 8/2018 | Nazzer | C02F 1/004 |
| 2019/0263678 A1* | 8/2019 | Nazzer | B01D 33/54 |
| 2019/0291028 A1* | 9/2019 | Nehlen, III | B01D 37/02 |
| 2020/0384387 A1* | 12/2020 | Nehlen, III | B01D 29/15 |
| 2021/0039023 A1* | 2/2021 | Nehlen, III | B01D 29/15 |
| 2021/0052996 A1* | 2/2021 | Nehlen, III | B01D 29/52 |
| 2021/0086111 A1* | 3/2021 | Nehlen, III | B01D 29/90 |
| 2021/0170308 A1* | 6/2021 | Nazzer | B01D 29/01 |
| 2021/0229006 A1* | 7/2021 | Nehlen, III | B01D 29/52 |
| 2021/0268409 A1* | 9/2021 | Ruzicka | B01D 29/15 |
| 2021/0331098 A1* | 10/2021 | Nehlen, III | B01D 29/52 |
| 2021/0346824 A1* | 11/2021 | Curley | B01D 29/15 |
| 2022/0062802 A1* | 3/2022 | Nehlen, III | B01D 29/15 |
| 2022/0143534 A1* | 5/2022 | Vallejo | B01D 29/96 |

* cited by examiner

LIQUID FILTRATION SYSTEM

OBJECT OF THE INVENTION

The object of the present invention is a liquid filtration system, comprising a filtration tank with a lower inlet for the liquid to be filtered, an upper outlet for the filtered liquid, and inside a series of hoses, whose outer surface forms a support for a filter medium.

TECHNICAL FIELD

The system of this invention is applicable in the field of the purification of all types of liquids with a low or medium load of contaminants and, mainly, for large volumes of water, coming from swimming pools, lakes, ponds or the like.

STATE OF THE ART

Different types of filters are currently known, among which it worth mentioning:

a) Water filters with polyester container, with a filtration surface corresponding to its area or section.

These filters house a filter medium inside that can be silica sand or recycled glass. Water enters the upper part of the container and passes through the filter medium to access tubes with holes or slots allowing the passage of filtered water, which is collected by the lower part of the container. The flow rate of water through the interior of the filter to achieve good filtering quality varies depending on the use of the water, a suitable rate for most uses being 30 m$^3$/hour per square metre of filtration area.

The polyester filter with the silica or glass filter medium has certain advantages such as low cost and diversity of models and sizes, and some disadvantages such as the use of a high amount of water in cleaning the filter, or the need to use numerous units for filtering large water volumes.

b) Steel filters with perlite regenerative filtering medium.

These filters are much more expensive than a polyester filter and have a vertical circular shape with sizes limited by their main characteristic of having a movable upper part and housing in their interior a movable roof from which hang hundreds of hoses, formed by a stainless steel base and coated with polyester mesh that serve as a support for the regenerative filtering medium, called perlite, and provide the filter with a large filtration surface, allowing it to work at low water flow rates with large volumes of water.

The water enters through the lower part of the filter and exits through the upper part after passing through the perlite filtering medium and through the hoses retaining in its interior any particles of dirt greater than 1 to 5 microns.

The useful filtering surface in this case is the area formed by the perlite that adheres to the hundreds of hoses. The movable roof inside has a pneumatic system, called Bump or Bumping, which goes up and down to regenerate the perlite that needs to be removed approximately every 4 hours and renewed approximately once a month. This movement causes the perlite to detach from the hoses.

Cleaning the filter requires manual intervention to leave the hoses perfectly clean. This cleaning is carried out by disassembling a front window of the filter and projecting pressurised water against the hoses, resulting in the waste of a significant amount of water.

A steel filter with hoses and perlite regenerative medium can have filtration surfaces of up to 150 m$^7$ and work at low water flow rates, about 3 m$^3$/hour for each square metre of filtering surface, which makes it possible to obtain a flow rate of about 450 m$^3$/hour of filtered water with a single filter.

These steel filters with perlite regenerative filter medium have certain disadvantages: they must be made of steel because of their movable roof and this makes them very expensive; limited sizes due to their mechanical characteristics and the need to have manholes and removable elements; and the necessary manual cleaning is difficult and arduous and has to be carried out by trained personnel.

c) Polyester filters with regenerative perlite filter medium.

Patent application PCT/ES2018/070356, claiming priority of the Spanish patent ES2690100 B2, of the same applicant of the present invention, describes a filter for the purification of large water volumes, and comprising: a polyester tank with a lower part and an upper part separated by a fixed separating roof; a collector for the inlet and distribution of water arranged in the lower part of the tank, with the water outlets facing downwards, and connected to a water inlet; a lower drain with a valve to remove dirt during cleaning of the filter; a cleaning device comprising a cleaning collector arranged above the collector for the inlet and distribution of water, consisting of a ring of tubes with small jets facing the upper area of the filter, said cleaning collector being connected to pump means for pumping pressurised fluid inwards during the cleaning steps thereof; a plurality of hoses secured to and suspended from the fixed separating roof, said hoses forming a support for the perlite filtering medium; a manhole for the assembly and maintenance of interior components; an upper opening for the outlet and purge of air provided, on the one hand, with air-detecting sensors connected to a control panel and, on the other hand, with a valve for opening and closing for air evacuation, automatically controlled by the control panel based on the signals provided by the probes; and an upper outlet for filtered water.

This filter provides different advantages such as low cost; possibility of having a variety of models and sizes, ability to filter large water volumes with a single unit; automatic cleaning using little water and without the need for specialised personnel.

The applicant themselves have identified some aspects that could be improved in this filter. Specifically, an aspect to be improved in this type of filter is the uncontrolled and sudden entry of water to be filtered from the inlet collector to the hoses, which can cause the perlite filter material to be released from the outer surface of the hoses, overriding or excessively reducing the filtration capacity of the system. This uncontrolled and sudden entry of water can also cause the lower ends of the hoses to hit each other and deteriorate, requiring replacement.

This replacement is an added problem because to make the change of any of the hundreds of hoses included in the tank it is necessary to disassemble the separating roof and remove the plate that covers all the hoses that are attached to it.

DESCRIPTION OF THE INVENTION

The liquid filtration system object of this invention, being of the type described in the aforementioned patent application PCT/ES 2018/070356 of the same applicant, incorporates technical characteristics that solve the aforementioned drawbacks.

Specifically, the invention presents technical characteristics that make it possible to successfully solve the aforementioned drawbacks, with regard to the uncontrolled entry of water to be filtered into the area of the tank in which the hoses and the perlite filtering filler are located, and the difficulty of replacing any of the hundreds of hoses included in the tank.

The system of the invention is of the type comprising: a filtration tank provided with a lower wall, a side wall and an upper wall; —a separating roof dividing the interior of the tank into a lower compartment and an upper compartment; —a pressure inlet duct for the liquid to be filtered towards an area close to the lower wall of said tank, —a plurality of hoses protruding from the separating roof towards the lower compartment, said hoses comprising: an outer surface forming a support for a filter medium, and an inner surface defining a duct, closed at the lower end and opened at the upper end, for circulating the filtered fluid towards the upper compartment, —an outlet duct for filtered water at the upper area of the tank, and—a regeneration circuit for the filter medium.

In order to avoid an uncontrolled and turbulent entry of water into the hoses and the filter medium comprised therebetween, the invention contemplates the incorporation into the tank of a fluid distributor plate, arranged between the inlet tube for the liquid to be filtered and the lower end of the hoses, said distributor plate comprising a central portion without perforations and a peripheral portion with a plurality of perforations for the passage and distribution of the liquid to be filtered towards the hoses.

To achieve virtually uniform distribution of the incoming liquid throughout the horizontal section of the tank, the inlet duct for the liquid to be filtered is arranged horizontally within the tank and comprises: an upper opening for supplying liquid to the holes proximate the central portion of the distributor plate, facing the central portion of the distributor plate, and a lower opening for supplying liquid to the holes of the peripheral portion of the distributor plate, facing a concave lower surface of the filtration tank.

The hoses comprise technical characteristics consisting of the incorporation of reinforcements at their upper and lower ends, further presenting the particularity that all the hoses are divided into independent groups, the hoses of each group being fixed to a support plate removably mounted on the separating roof of the filter tank. This feature allows disassembling any of the groups of hoses from the separating roof and replacing it with another group of hoses, without the need to disassemble the whole of the separating roof, nor the rest of the groups of hoses mounted on it.

DESCRIPTION OF THE FIGURES

In order to complement the description that is being carried out and with the purpose of facilitating the understanding of the features of the invention, the present description is accompanied by a set of drawings wherein, by way of a non-limiting example, the following has been represented.

PREFERRED EMBODIMENT OF THE INVENTION

Figure 1:
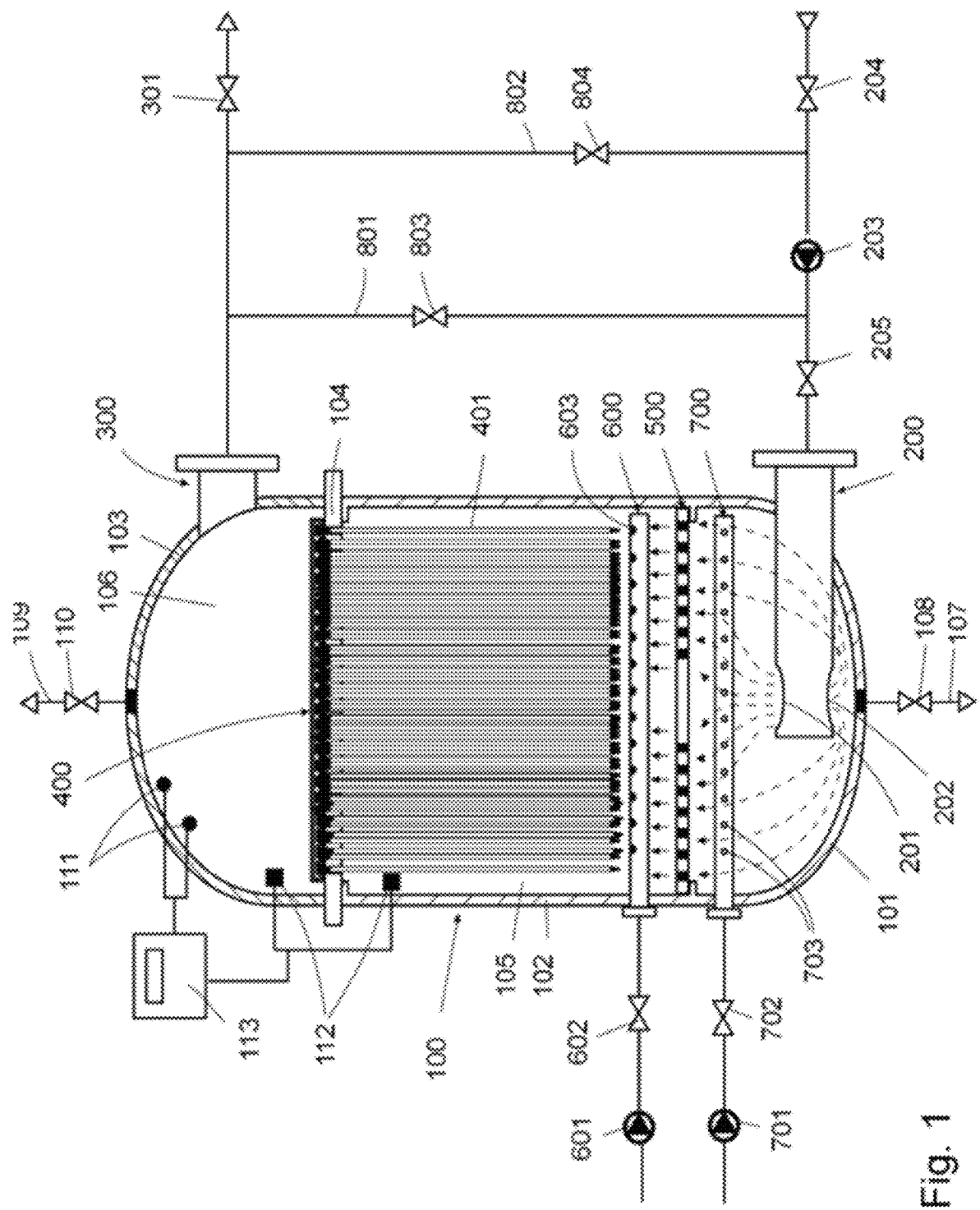
FIG. 1 shows a schematic elevation view of an exemplary embodiment of the liquid filtering system according to the invention, in which the tank has been sectioned along a vertical plane.

In the exemplary embodiment shown in FIG. 1, the liquid filtration system comprises a filtration tank 100 made of resin provided with a lower wall 101, a side wall 102 and an upper wall 103.

A separating roof 104 is mounted in said tank 100 that divides the interior of said tank into a lower compartment 105 and an upper compartment 106.

The tank 100 has a lower draining opening 107 with a drain valve 108 and an upper outlet 109 with a venting valve 110.

It further comprises water detection sensors 111 located in the upper compartment and two pressure sensors 112 connected to a control panel 113. Such pressure sensors 112 detect the differential pressure existing between the lower compartment 105 and the upper compartment 106 of the tank.

The tank 100 has, at its lower end, an inlet duct 200 for the liquid to be filtered towards n area close to the lower wall 101 of said tank and, at its upper end, an outlet duct 300 for the filtered water.

A first valve 204, a pump 203 for pumping liquid into the tank 100, and a second opening and closing valve 205 are mounted on the inlet duct 200 outside the tank 100.

The outlet 300 also has an opening and closing valve 301.

Inside said tank 100, a plurality of hoses 401 protruding downwards from said separating roof 104 towards the lower compartment 105 is arranged.

The outer surface of the aforementioned hoses 401 forms a support of an unrepresented perlite filter medium.

The tank 100 comprises a fluid distributor plate 500 arranged horizontally between the inlet duct 200 and the lower end of the hoses 401.

Figure 2:
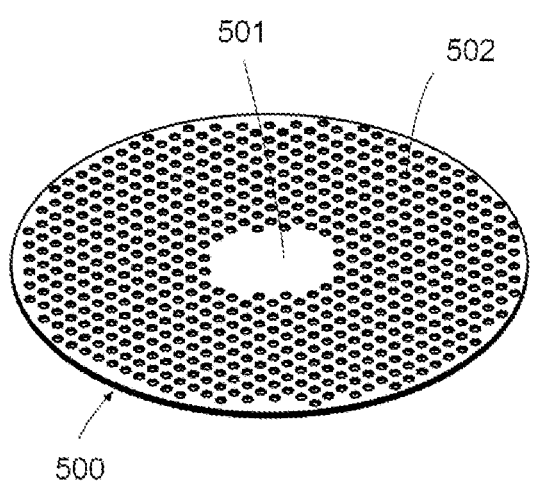
FIG. 2 shows a perspective view of the plate for the distribution of the fluid to be filtered, represented in FIG. 1 inside the tank.

As can be seen in FIG. 2, said distributor plate 500 comprises a central portion 501, without perforations, and a peripheral portion 502 with a plurality of perforations for passage and distribution of the liquid to be filtered supplied by the inlet duct 200 towards the filter medium fixed externally to the hoses 401.

In FIG. 1, the inlet duct 200 has an upper opening 201 for supplying liquid to the holes in the distributor plate 500 proximate the central portion 501 of the distributor plate 500 and a lower opening 202 for supplying liquid to the holes of the peripheral portion 502 of the distributor plate which are furthest away from the central portion 501. This lower opening 202 faces the lower surface 101, which is concave and guides the liquid projected by said lower opening 202 into the holes of the peripheral portion 502, which are furthest away from the central portion 501 of the distributor plate 500.

In FIG. 1, the path described by the liquid projected by the upper 201 and lower 202 openings of the inlet duct 200 towards the holes of the distributor plate 500 has been represented with a dashed line.

The central portion 501 of the distributor plate 500 has no holes and preferably has a circular shape and a diameter greater than the diameter of the inlet duct 200, thereby ensuring that the water flow projected through the upper opening 201 inevitably hits the aforementioned central portion 501 of the plate that distributes it towards the nearest holes of the peripheral portion 502, preventing it from suddenly or turbulently entering the lower compartment 105 of the tank, in which the hoses and the perlite filter medium are housed.

Figure 3:
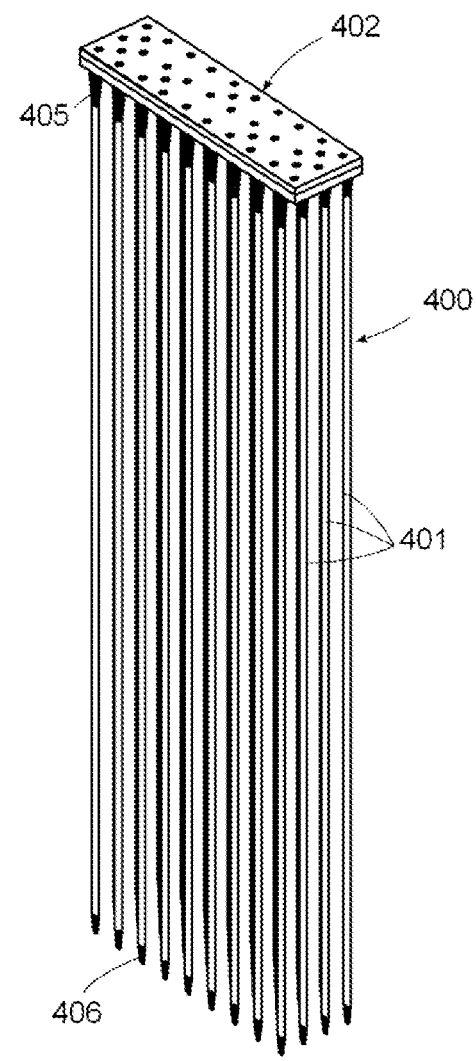
FIG. 3 shows a perspective view of one of the Independent groups of hoses attached to the corresponding support plate and disassembled from the tank separating roof.

The hoses 401 included in the tank, which are generally hundreds of hoses to define a large filtration surface, are distributed into independent groups 400, such as that depicted by way of example in FIG. 3.

Each group 400 forms a single, inseparable monoblock assembly comprising several hoses 401 attached at their upper end to a support plate 402 removably mounted on the separating roof 104 of the tank 100; such that each group 400 can be individually disassembled and replaced without the need to disassemble the separating roof 104, or to remove the remaining groups 400 of hoses 401 mounted on said separating roof 104.

The support plate 402 has through holes for mounting fixing screws to the separator roof 104 of the tank 100.

The hoses 401 are closed at their lower end and have protective coatings 405, 406 respectively at the upper and lower ends.

In one exemplary embodiment, the upper end protective coating 405 comprises a retractable polyolefin tube that protects it from possible friction with the separating roof 104; while the lower end protective coating 406 comprises a flange for keeping the braided fibre covering each hose 401 tensioned, a retractable polyolefin tube, and a resin coating of a polymeric compound with high resistance to high temperatures and chemical agents. With this protective coating 406, the lower end of the hose 401 is closed without using a plastic plug or other element capable of being accidentally disassembled and released from the hose 401.

This protective coating 406 also prevents the lower end of the hoses 401 from easily deteriorating due to, for example, hitting the other hoses.

To perform regeneration of the filter medium housed inside the tank, this system comprises a regeneration circuit of the filter medium, depicted in FIG. 1.

Said regeneration circuit comprises an air supply pipe 700 connected to a blower pump 701 and provided with an opening and closing valve 702, said air supply pipe 700 having a plurality of air outlets 703 located below the distributor plate 500.

The filter self-cleaning circuit comprises a water supply pipe 600 connected to a cleaning pressure pump 601 and provided with a valve 602, said water supply pipe 600 having a plurality of water outlets 603, located above the distributor plate 500 and below the hoses, and facing the upper area. Said water outlets 603 are constituted by fan sprinklers positioned in such a way that they access all the passageways located between the hoses 401.

During filtration, the filter medium regeneration circuit remains inoperative, with pumps 601, 701 inactive and valves 602, 702 in the closed position.

In the embodiment shown in FIG. 1, the valves 204, 205 are arranged in series in the inlet duct 200, and the valve 301 is also arranged in series in the outlet duct 300, said valves delimiting in the inlet duct 200 and in the outlet duct 300 sections connected by branches 801, 802, provided with separate valves 803, 804 for backwashing and recirculation of filtered water towards the inlet duct respectively inside the tank.

This system allows different operations and work cycles to be carried out.

Precoat: During this operation the perlite filter medium adheres to the outer surface of the hoses 401. In this phase, the pump 203 is activated at low speed by means of a frequency variator, taking into account that, in each installation, the rate will vary and must be adjusted during the start-up of the filtration system, at a speed lower than the usual working speed.

Once the pump 203 is activated, the valve 205 and the aeration valve 110 are opened, when the sensors 111 detect that all air has exited the tank 100, the aeration valve 110 is closed and the recirculation valve 804 is opened. After a certain time, with the perlite filter material girding the hoses, the system is passed to the filtration phase.

Filtering: Once the previous precoat operation has been performed, in which the perlite has been placed around the hoses, the recirculation valve 804 is closed, the valve 301 is opened and the speed of the pump 203 is increased until the desired flow rate is reached, maintaining the filtration until the perlite filter medium is saturated, that is, it has retained in its external part so many dirt particles that the differential pressure between the upper compartment 106 and the lower compartment 105 is increased; this differential pressure increase being detected by the pressure sensors 112 located in the upper compartment 106 and in the lower compartment 105 of the tank.

Regeneration of the filter medium (perlite): In this regeneration phase the suction and pumping valves 205 and 301 are closed and the aeration valve 110 is opened; then the blower pump 701 is started and the valve 702 is opened by injecting pressurised air through the air outlets 703 of the air supply duct 700 located under the distributor plate 500. The air supplied passes through the perforations of the distributor plate 500, ascending perfectly distributed throughout the tank section. After a while, the valve 702 is closed and the blower pump 701 is disconnected. In this regeneration phase, all the perlite filter medium and dirt are removed, and a new precoat operation must then be performed to reposition the perlite around the hoses 401.

Filter self-cleaning and changing the filter medium: After a certain time of use, and several regenerations of the perlite filter medium, it is necessary to make its change and the self-cleaning of the filter. The process of self-cleaning and change of perlite is fully automated except for the filling of perlite, which will usually be a manual process, being able to be carried out automatically by means of some hopper feed system or similar, and can be carried out only starting from the idle state, in which all the valves are closed and all the pumps switched off.

In this phase, the aeration valve 110 is opened, the blower pump 701 is activated, and the valve 702 is opened causing the micronized perlite to detach completely from the hoses 401. While the blower pump 701 is operating, the emptying valve 108 is opened so that the tank 100 is emptied while the fluid and the perlite remain under the effects of the pressurised air stream. When the tank is empty, the valve 702 is closed and the blower pump 701 is deactivated.

Subsequently, the self-cleaning sequence continues, opening the valve 602 and activating the cleaning pump 601 the pressurised water exits through the outlets 603 of the tube 600, cleaning all the hoses 401 and the tank. Once performed the cleaning, the cleaning pump 601 is deactivated and the valve 602 is closed.

Backwashing: This operation is carried out after cleaning with pressurised air to separate the micronized perlite from the hoses and having rinsed the hoses and tank with water.

Backwashing or washing backwards, allows a final rinse of the hoses 401 by injecting water in backward flow. To do this, the pump 203 is activated at low speed and the backwash valve 803 is opened keeping the emptying valve 108 and the aeration valve 110 open going into the idle state.

Once the nature of the invention as well as an example of preferred embodiment have been sufficiently described, it is stated for all pertinent purposes that the materials, form, size and arrangement of the elements described are susceptible to changes, provided these do not involve an alteration of the essential features of the invention which are claimed below.

The invention claimed is:

1. A liquid filtration system, comprising:
   a filtration tank provided with a lower wall, a side wall and an upper wall;
   a separating roof dividing the inside of the tank into a lower compartment and an upper compartment;
   a pressure inlet duct for the liquid to be filtered towards an area close to the lower wall of said tank;
   a plurality of hoses protruding from the separating roof towards the lower compartment;
   said hoses comprising an outer surface forming a support for a filter medium and an inner surface defining a duct for circulating the filtered fluid, closed at the lower end and opened at the upper end towards the upper compartment;
   an outlet duct for filtered water at the upper part of the tank;
   a regeneration circuit of the filter medium, said regeneration circuit of the filter medium comprising an air supply tube connected to a blower pump and provided with an opening and closing valve;
   a filter self-cleaning circuit, said filter self-cleaning circuit comprising a water supply pipe connected to a pumping pump and provided with an opening and closing valve; and
   a control panel;
   wherein:
   said tank internally comprises a fluid distributor plate, arranged horizontally between the inlet duct for the liquid to be filtered and the lower end of the hoses; said distributor plate comprising a central portion without perforations, and a peripheral portion with a plurality of perforations for the passage and distribution of the liquid to be filtered towards the hoses,
   the inlet duct for the liquid to be filtered is arranged horizontally within the tank and comprises: an upper opening for supplying liquid to the holes proximate the central portion of the distributor plate, facing the central portion of the distributor plate, and a lower opening for supplying liquid to the holes of the peripheral portion of the distributor plate that are furthest away from the central portion, facing a concave lower surface of the filtration tank.

2. A liquid filtration system, including the features of claim 1, wherein the central portion of the distributor plate is circular, and has a diameter larger than the diameter of the inlet duct for the liquid to be filtered.

3. A liquid filtration system, including the features of claim 1, wherein the hoses comprise a spring externally coated with a braided fibre made of a high toughness, high chemical resistance polymeric compound and capable of withstanding high temperatures, said hoses externally comprising, at the upper and lower ends, protective coatings comprising a polyolefin retractable tube and, further, at the lower end, a resin coating of a polymeric compound with high resistance to high temperatures and chemical agents.

4. A liquid filtration system, including the features of claim 1, wherein the hoses are divided into independent groups; and the hoses of each group are attached at their upper end to a filter plate removably mounted on the separating roof of the filter tank.

5. A liquid filtration system, including the features of claim 1, wherein said air supply tube has a plurality of air outlets located below the distributor plate.

6. A liquid filtration system, including the features of claim 1, wherein said water supply pipe has a plurality of water outlets located above the distributor plate and below the hoses.

7. A liquid filtration system, including the features of claim 1, wherein the inlet duct and the outlet duct have opening and closing valves arranged in series delimiting two sections of inlet and outlet duct connected by branches of recirculation for the filtered water towards the inlet and circulating duct against the flow through the interior of the tank.

* * * * *